May 15, 1934.　　　H. A. TOULMIN, JR　　　1,958,729
BIFOCAL LENS
Filed July 6, 1931　　　2 Sheets-Sheet 1

INVENTOR
HARRY A. TOULMIN JR.
BY Toulmin & Toulmin
ATTORNEY

May 15, 1934.   H. A. TOULMIN, JR   1,958,729
BIFOCAL LENS
Filed July 6, 1931   2 Sheets-Sheet 2
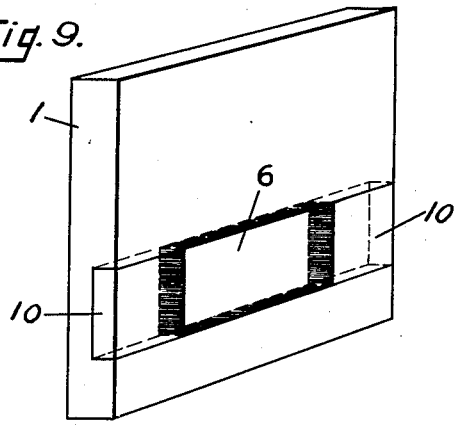
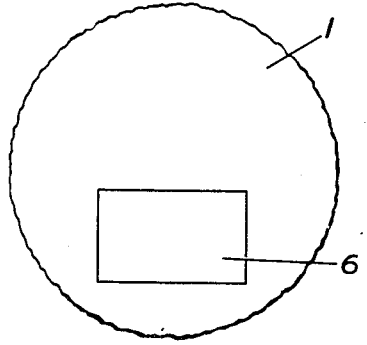
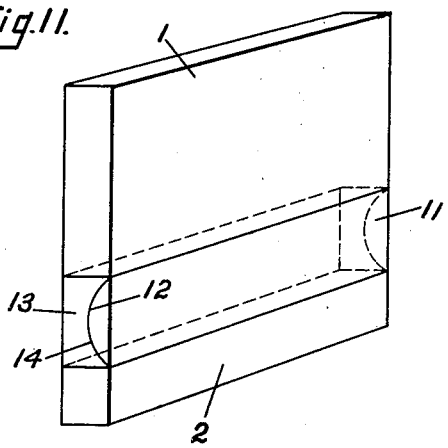
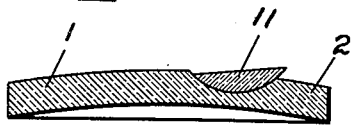
INVENTOR
*HARRY A. TOULMIN JR.*
BY
ATTORNEY Patented May 15, 1934

1,958,729

UNITED STATES PATENT OFFICE 1,958,729

BIFOCAL LENS

Harry A. Toulmin, Jr., Dayton, Ohio, assignor to The Univis Corporation, Dayton, Ohio, a corporation of Delaware Application July 6, 1931, Serial No. 548,757

4 Claims. (Cl. 88—54)

My invention relates to bifocal eyeglass lenses and the method of manufacturing.

It is the object of my invention to provide a very cheap and accurate method of manufacturing a bifocal eyeglass lens and of providing a resulting lens that requires the minimum of skill in its production, as well as materials of simple form and of relatively cheap nature.

It is a further object to provide a bifocal lens having a near vision fused insert with a maximum breadth of the insert and produced by a method which eliminates all grinding of the major lens.

It is a further object to provide a bifocal lens of the cut-through type, that is, the type with the insert extending completely through the major lens, which can be cheaply and efficiently manufactured and eliminates the difficulties which heretofore have existed in manufacturing a lens in which the major lens had to be pierced in order to insert the near vision portion, with the consequent difficulties of fusing, particularly the near vision insert within the distance portion of the lens, when using glasses of different melting points and of different indices of refraction.

Referring to the drawings, Figure 1 is a perspective of the assembled, unfused raw stock blank.

Figure 8 is a section through the finished bifocal eyeglass lens, the blank for which is shown in Figure 4.

Figure 9 is a perspective of a blank having alternate inserts of flint and crown glass.

Figure 10 is a plan view of the lens resulting from the blank shown in Figure 9.

Figure 11 is a perspective of a blank in which an arcuate back insert that can be rocked to its desired position may be employed.

Figure 12 is a section similar to Figure 4 showing the arrangement of the insert prior to surface grinding which results from the blank shown in Figure 11.

Figure 13 is a section through the finished bifocal eyeglass lens resulting from the grinding of the blank in Figure 12.

Figure 1:
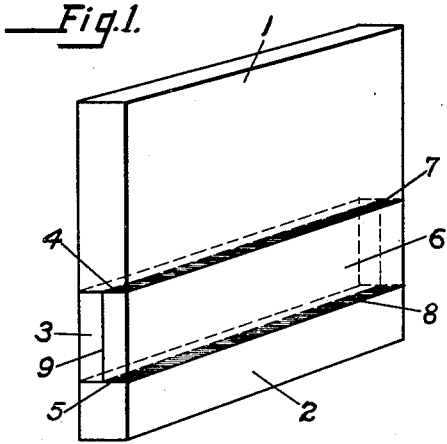

Referring to the drawings in detail, I provide rectangular strips or blocks of crown glass 1, 2 and 3. I lay between the surface 4 of the block 1 and the surface 5 of the block 2 a bar or strip 6 of flint glass or of barium crown glass. The upper and lower surfaces 7 and 8 of this bar of glass 6 are roughened to form a grey edge. This roughening may be imparted by chemical action, by mechanical action, or by sand blasting. Its purpose is to prevent the reflection of light in the resulting lens. I also may, but it is not essential, roughen the adjacent faces 4 and 5 of the crown glass members 1 and 2 where they engage the grey surfaces 7 and 8 of the bar 6.

I place the bar 3 in engagement at the back of the flint bar 6 and between the surfaces 4 and 5 of the crown glass blocks 1 and 2.

Figure 2:
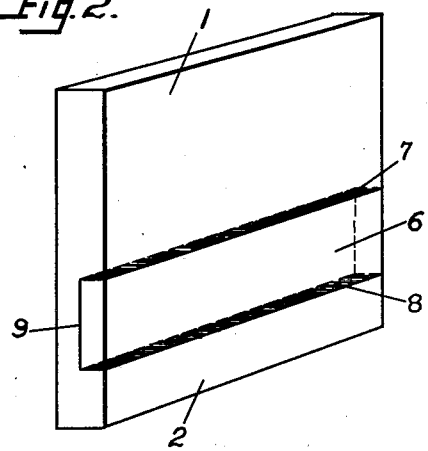
Figure 2 is a similar view after fusing.
Figure 3:
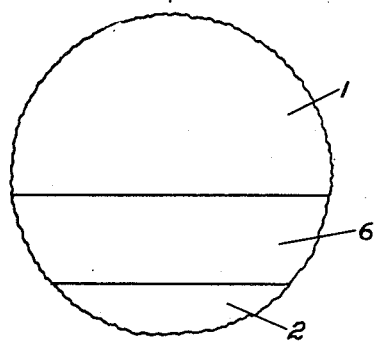
Figure 3 is a plan view after the fused raw stock blank has been cut to marginal form and ground to shape.
Figure 4:
Figure 4 is a section on the line 4—4 of Figure 3.

The composite structure is then fused with the result shown in Figure 2 so that the back 9 and the top edges 7 and 8 of the bar 6 are fused to the blocks 1, 2 and 3. The block thus fused is then trimmed as in Figure 3 to the desired outline of the lens and the trimmed block is ground to form a rough blank as shown in Figure 4. The finished lens is shown in Figure 8. The inter-face 9 is illustrated as flat, but it will be obvious to those skilled in the art that this inter-face may be given various curvatures to produce a variety of reading additions.

Figure 6:
Figure 6 is a section through such a lens as finally manufactured, such section being taken on the line similar to that of Figure 4.
Figure 5:
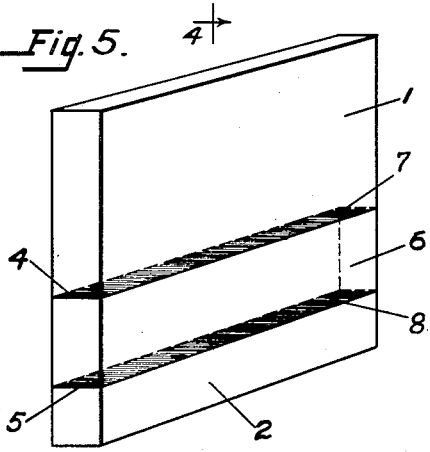
Figure 5 is a view similar to Figure 2 except that it shows the arrangement of a blank for making a cut-through type of lens.
Figure 7:
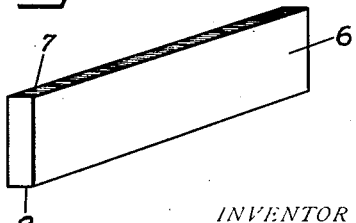
Figure 7 is a perspective of the insert for the near vision portion, such as of flint or barium crown glass showing the greyed edge.

In Figures 5 and 6 are shown the raw stock bar and the section of the finished blank where a cut-through lens is desired. Heretofore, to make a cut-through lens, it has been the practice to take the major lens of the distance portion of the crown glass, bore a hole through the glass and then plug the hole with a piece of flint glass. Then the lens blank was fused. The difficulties of making such a lens have been numerous, amongst them being the difficulty of grinding the hole accurately, the difficulty of grinding the margin of the insert to fit the hole, and the difficulty of fusing due to the difference in diameter of the segment and the diameter of the hole necessary for the insertion of the insert in the hole.

Furthermore, the adjacent edges of the insert and the hole could not be roughened to furnish a grey surface to prevent light reflection because this roughening would upset the accuracy of the fit.

By the present arrangement, relatively unskilled labor can be employed and maximum production secured by welding the three bars together having adjacent grey faces and then finishing the bars in their welded condition to the proper marginal and angular configuration for an eyeglass lens as shown in Figure 6. The lens can then be ground into its finished form according to the prescription of the wearer. Ordinarily straight bars with flat edges are employed and no difficulties are encountered in quantity manufacture.

The resulting lens has structural advantages for the wearer that are important. In the first place, by varying the depth of the bar 6, any depth of reading segment may be employed. As the bar 6 runs completely across the lens, the maximum width of reading field is secured. If desired, the bar 2 may be of sufficient depth to permit of seeing at a distance beneath the bar 6. By adequate grinding, the optical center of the insert can be adjusted to the needs of the wearer.

Referring to Figure 9, it will be observed that if it is desired to see at a distance on either side of the block 6, that by using the crown insert blocks 10 this result may be secured. The resulting lens is shown in Figure 10. The advantage of such a lens in Figure 10 is that the optical displacement when the eye passes laterally from the reading insert to the distance portion of the lens on either side of the insert, or vice versa is greatly reduced.

Referring to the form shown in Figures 11, 12 and 13, it will be noted that if desired this built up lens may be so arranged that the optical center of the insert can be thrown either up or down as desired. By utilizing the insert of flint glass designated 11 having an arcuate back 12 resting in the arcuate face crown block 13, having a corresponding arcuate face 14 receiving the face 12 of the insert 11, it is possible to rock the insert 11 in any angular position and fuse it in that position with the result shown in Figures 12 and 13. As shown in Figure 13 the optical center has been placed in the smaller part of the insert, as distinguished from the upper part of the insert.

Thus by this system of building a lens, with strips or bars of glass having plane flat surfaces or simple cylindrical surfaces, quantity production of very accurate lenses can be secured and raw stock from which lenses are made can be produced with continuous production methods, thus materially reducing the cost without sacrificing accuracy and with an improvement in the reading qualities of the lenses.

It will be understood that I desire to comprehend within my invention the use of any type of glass and that when I use the term "crown glass" or "flint glass" I do not intend to be confined to this particular type of glass but employ these terms to differentiate concisely the glasses of different refractive indices employed. Furthermore, it will be understood that instead of building up the rough blank as in Figures 1 and 2, I may select a plate of crown glass and mill a rectangular slot in the face thereof for the reception of the flint glass insert, although I prefer a built up method as a quicker and cheaper method, requiring no expert grinding. Likewise a transverse cut-away depression may be formed in the face of the crown glass plate having an arcuate bottom for the reception of the rocking flint insert shown in Figures 11, 12 and 13.

Having thus fully described my invention, what I claim as new and desire to secure by Letters Patent, is:

1. A bifocal lens of two united glass pieces only, comprising a distance lens of crown glass, and a transversely arranged insert of flint glass having a flat top and bottom and extending entirely across the distance lens from side to side thereof.

2. A bifocal lens of two united glass pieces only, comprising a distance lens of crown glass having a transversely arranged groove therein with flat top and bottom walls and a flint bar inserted therein extending completely across the face of the distance lens, said flint insert bar being surrounded by the distance lens on the top, bottom and back thereof.

3. A bifocal lens blank of two united glass pieces only, comprising a block of crown glass having a rectangular slot extending entirely across one face thereof and an insert of flint glass fused in said slot, the upper and lower walls of said slot being flat and parallel to each other.

4. A bifocal eyeglass lens blank of united pieces of glass comprising a plate of crown glass having a rectangular slot extending entirely across one face thereof and a filler secured in said slot comprising alternate sections of crown and flint glass the flint segment thus formed having a ridge of variable height completely around its periphery.

HARRY A. TOULMIN, Jr.